Aug. 6, 1929.                G. H. PALMER                    1,723,366
                           AUTOMOBILE BUMPER
                          Filed Oct. 25, 1928
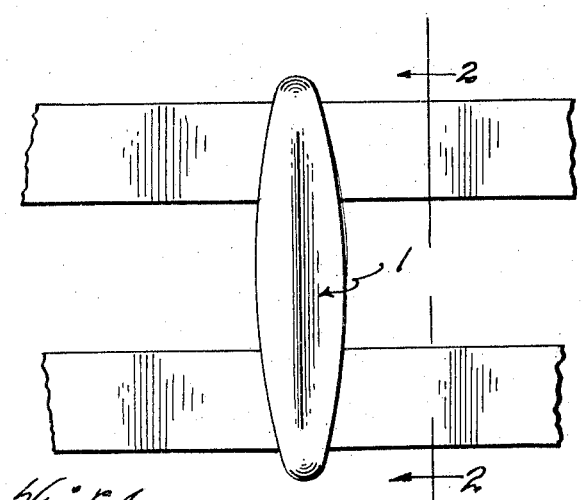
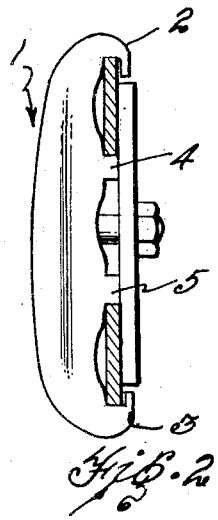
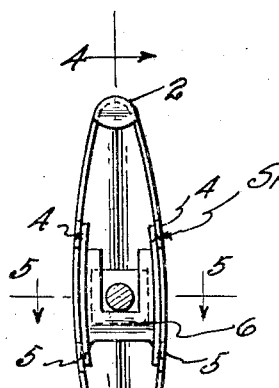
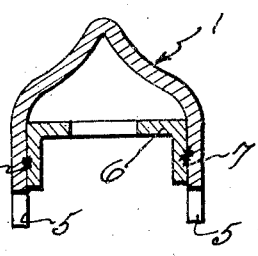
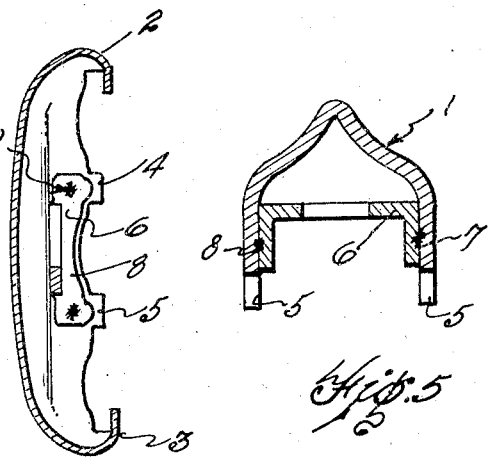
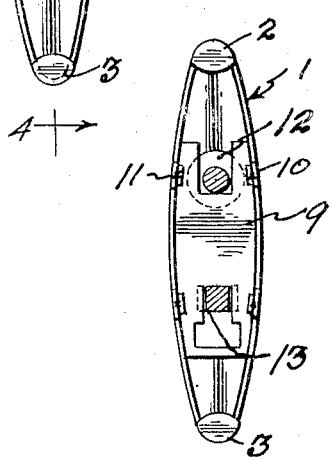
INVENTOR.
GEORGE H. PALMER
BY
ATTORNEY.

Patented Aug. 6, 1929.

1,723,366

UNITED STATES PATENT OFFICE.

GEORGE H. PALMER, OF LANSING, MICHIGAN, ASSIGNOR TO DAIL STEEL PRODUCTS COMPANY, OF LANSING, MICHIGAN, A CORPORATION OF MICHIGAN.

AUTOMOBILE BUMPER.

Application filed October 25, 1928. Serial No. 314,907.

This invention relates to automobile bumpers, and has to do particularly with the clamps for holding the bumper bars in assembled position.

It has become the vogue to plate various trimmings on automobiles, and this has included the bumper bars and bumper clamps. A very recent tendency along this line has been to chromium plate the bumper bars and bumper clamps, but considerable difficulty has been experienced in the plating of the bumper clamps, mainly due to their inherent structure. It has been customary to form clamps of cast iron or semi-steel, with the result that the surfaces of such bumper clamps are pitted and very rough. With such rough surfaces it has been impossible to obtain a satisfactory chromium plating thereof even if the surfaces of the bumper clamps have been smoothed by grinding.

It is the object of the present invention to substantially eliminate this expensive and difficult grinding operation and to form a bumper clamp which is not only initially smooth on its exposed surfaces but which is compact and very rigid. This novel bumper clamp is preferably formed of sheet metal which is drawn very deep so as to present a well reinforced bumping surface and which has its ends inturned to properly receive the bumper bars, and which is also provided with an internal plate for receiving the securing bolts.

Another feature of this invention relates to the manner of forming a bolt receiving plate and the manner of positioning the same within the deep drawn clamp, whereby such plate may be spot welded to the clamp body proper so as to form a very rigid structure.

In the drawings:

Fig. 1 is a fragmentary elevation of my novel bumper clamp shown in assembled relation with the bumper bars.

Fig. 2 is a sectional view taken on line 2—2 of Fig. 1.

Fig. 3 is a rear view of my novel bumper clamp and illustrating the manner of positioning and spot welding a bolt plate within the clamp.

Fig. 4 is a sectional view taken on line 4—4 of Fig. 3 illustrating the deep drawn feature of the clamp, and also the arrangement of the flanges and the bolt retaining plate whereby the plane of the plate is positioned a considerable distance from the rear edge of the clamp.

Fig. 5 is a sectional view taken on line 5—5 of Fig. 3 illustrating the formation and manner of reinforcing the bumper clamp and the manner of positioning the bolt retaining plate therein.

Fig. 6 is a rear view similar to Fig. 3 but illustrating a modified form of bolt retaining plate whereby to receive three bumper bars instead of two.

It will be understood that my novel bumper clamp may take various shapes both as to general contour and cross section, but in its preferred form it is preferably deep drawn so as to present a hollow structure. The bumper clamp illustrated in the drawings is formed in the general shape of a canoe.

The bumper clamp may be generally designated 1 and in addition to the fact that it is preferably deep drawn or hollow in cross section it is provided with rounded and inturned ends 2 and 3, whereby to assist in positioning and securing the bumper bars in place. Suitable lugs 4 and 5 are formed on each side of the bumper clamp and are adapted to cooperate with the inturned portions 2 and 3 whereby to position the bumper bars.

This entire bumper clamp is preferably formed from a single piece of sheet metal with the result that the clamp itself is deep drawn and hollow so as to present a very compact and rigid structure, the outer surface of which is smooth and may be readily adapted to chromium plating. The clamp itself is not only cheaper and easier to fabricate than a corresponding cast metal clamp, but it is substantially stronger for the particular use to which it is adapted.

In order to apply a very rigid reinforcing member to receive the bumper bar positioning bolts, I have provided a completely separate plate 6 which is U-shaped in cross section to provide the flange members 7 and 8. These flange members 7 and 8 cooperate with the side walls of the clamp and are preferably so formed as to cooperate adjacent the lugs 4 and 5. With this plate 6 inserted, as best shown in Fig. 5, it will be obvious that a very rigid and well reinforced structure is obtained.

The side flanges 7 and 8 of the plate member 6 are preferably spot welded at the points shown in Figs. 3, 4, and 5, with the result that an exceedingly rigid and well reinforced structure is obtained, whereby considerable pressure may be placed upon the bolts whereby to position and secure the bumper bars in place. This is in direct contrast to the cast retaining lugs usually used in cast metal clamps which very frequently break or bend. The plate 6 is formed of sheet metal of fairly heavy gage and by reason of the fact that the flanges 7 and 8 are inturned and spot welded, as shown, it will be obvious that I have not only formed an exceedingly strong bolt retaining structure but that the clamp itself is directly reinforced.

In the modification shown in Fig. 6, I preferably utilize a bolt retaining plate 9 which is provided with flanges 10 and 11 similar to the plate 6 and which is provided with two slots 12 and 13 which are so positioned as to receive two bolts whereby either two or three bumper bars may be secured in position.

It will thus be seen that I have provided a pressed steel clamp which substantially eliminates grinding and which only requires a small amount of abrasive action to smooth and polish the same. This pressed steel clamp not only produces a much better finish than can be secured on a casting, as it is impossible to polish out of malleable castings all of the pits, with the result that such remaining pits leave a broken surface that will in turn leave a broken surface on the plating which will set up a rusting action. Obviously a pressed steel clamp being perfectly smooth and having an even finish will make possible a smooth, even plating surface.

What I claim is:

1. An automobile bumper construction, comprising a bumper clamp, said clamp having a hollow body pressed from sheet metal whereby to present a smooth exterior surface and a securing bolt with its head wholly located and anchored on the rear of said hollow body and concealed by said body.

2. Bumper clamp construction for automobile bumpers, comprising a clamp formed of stamped sheet metal, and a member spot welded to the inside of said clamp for receiving a bumper bar securing bolt.

3. A bumper clamp, comprising a stamped clamp body of sheet metal and a bridge back of said clamp for holding a securing member.

4. Bumper clamp construction for automobile bumpers of the type adapted to be plated, comprising a stamped sheet metal bumper clamp hollow in cross section, and a plate positioned within said hollow clamp and provided with side flanges spot welded to the side walls of the clamp.

5. A bumper clamp construction for automobile bumpers of the type adapted to be plated, comprising a relatively deep hollow clamp formed of sheet metal whereby to present a smooth outer surface, a sheet metal plate having turned out flanges positioned interiorly of the side walls of the clamp, the flanges extending laterally and parallel with the side walls and being spot welded to such side walls.

6. Bumper clamp construction for automobile bumpers of the type adapted to be plated, comprising a relatively deep hollow clamp formed of sheet metal whereby to present a smooth outer surface, and a slotted plate with lateral flanges positioned interiorly of the side walls of the clamp, the flanges of said plate being spot welded to the side walls of the clamp.

7. An automobile bumper construction, a bumper clamp, said clamp including a hollow body of channel shaped cross section pressed from sheet metal whereby to present a smooth surface and bumper bar fastening means adapted to be secured within the hollow clamp and concealed thereby.

8. An automobile bumper construction including a bumper clamp shaped to form a pocketed portion in the rear thereof and pressed from sheet metal whereby to present a smooth surface, a bridge member within the pocketed portion and concealed thereby and bumper bar fastening means secured to said member.

9. Bumper clamp construction for automobile bumpers comprising a clamp formed of stamped sheet metal and a member welded to the inside of said clamp and bumper bar fastening means adapted to be secured to said member.

10. A bumper clamp comprising a stamped clamp body of sheet metal provided with a pocketed portion in the rear thereof and a reinforcing bridge member located within the pocketed portion and concealed thereby and bumper bar fastening means secured to said reinforcing bridge.

11. Bumper clamp construction for automobile bumpers comprising a clamp formed of stamped sheet metal of channel shaped cross section, a member secured within the confines of said clamp and bumper bar fastening means adapted to be secured to said member.

12. Bumper clamp construction comprising a stamped clamp body of sheet metal and a bridge rigidly secured to the clamp body and constituting a reinforcing means therefor, said bridge having means for receiving a bumper bar fastening device.

13. Bumper clamp construction comprising a stamped clamp body of sheet metal and a bridge on the back of said clamp for holding a secured member, said clamp being provided with rearwardly extending lugs adapted to engage the edges of the bumper bars.

14. A bumper clamp construction comprising a sheet metal body of hollow shaped cross section, a member secured within the hollow clamp and lugs provided by said clamp body for engaging the bumper bars and means for securing the clamp to the bars.

15. Bumper clamp construction for automobile bumpers comprising a clamp formed of stamped sheet metal, an outwardly extending lug provided by an edge of said clamp for engaging the bumper bar and bumper bar fastening means secured to said clamp.

16. Bumper clamp construction for automobile bumpers comprising a clamp formed of stamped sheet metal channel shaped in cross section and provided with two rearwardly extending side flanges, lugs provided by the edges of said flanges intermediate the ends of the clamp and bumper bars fastening means adapted to secure said clamp to the bumper bars.

17. Bumper clamp construction for automobile bumpers comprising an elongated clamp formed of sheet metal, said clamp having a major and minor axis and being of channel shaped cross section, rearwardly extending lugs provided by said clamp, a bridge member located within the channel shaped clamp and means for securing the bridge member within the hollow clamp and bumper bar fastening means secured to the bridge.

18. A bumper clamp construction comprising a body member formed of sheet metal and shaped to form a pocketed portion in the rear thereof, rearwardly extending lugs provided by the body portion intermediate the ends thereof for extending between the bumper bars, cooperating elements provided by the end portions of the body member for engaging other portions of the bars and bumper bar fastening means secured to said clamp.

19. A bumper clamp construction for automobile bumpers comprising a hollow body formed of stamped sheet metal and of substantially canoe shape and bumper bar fastening means adapted to be secured to said body within the interior thereof.

In testimony whereof I affix my signature.

GEORGE H. PALMER.